United States Patent
Bayer et al.

(10) Patent No.: US 11,699,159 B2
(45) Date of Patent: *Jul. 11, 2023

(54) SYSTEMS AND METHODS FOR MONITORING AND ANALYZING FINANCIAL TRANSACTIONS ON PUBLIC DISTRIBUTED LEDGERS FOR SUSPICIOUS AND/OR CRIMINAL ACTIVITY

(71) Applicant: Jumio Corporation, Palo Alto, CA (US)

(72) Inventors: Andreas Bayer, Walnut Creek, CA (US); Kevin Feng, San Francisco, CA (US); Benjamin Tyson Duranske, Menlo Park, CA (US)

(73) Assignee: Jumio Corporation, Sunnyvale, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/153,822

(22) Filed: Jan. 20, 2021

(65) Prior Publication Data
US 2021/0142331 A1    May 13, 2021

Related U.S. Application Data

(63) Continuation of application No. 16/504,046, filed on Jul. 5, 2019, now Pat. No. 10,902,431, which is a
(Continued)

(51) Int. Cl.
*G06Q 20/40* (2012.01)
*G06F 16/35* (2019.01)
(Continued)

(52) U.S. Cl.
CPC ......... *G06Q 20/4016* (2013.01); *G06F 16/35* (2019.01); *G06F 16/951* (2019.01); *H04L 9/0637* (2013.01)

(58) Field of Classification Search
None
See application file for complete search history.

(56) References Cited

U.S. PATENT DOCUMENTS 8,788,405 B1 * 7/2014 Sprague ................. G06F 16/35
705/38
9,635,000 B1 * 4/2017 Muftic ................. H04L 9/3239
(Continued)

*Primary Examiner* — Scott A Zare
(74) *Attorney, Agent, or Firm* — Patent Law Works LLP

(57) ABSTRACT

Systems and methods configured for monitoring and analyzing financial transactions on public distributed ledgers for suspicious and/or criminal activity are disclosed. Exemplary implementations may: access public third-party information for addresses involved in financial transactions; correlate a first portion of the public third-party information with transaction addresses; label the financial transactions and/or the addresses according to characteristics, such that individual ones of the addresses either have been labeled or are unlabeled; cluster the financial transactions and/or the addresses into a set of clusters that includes a first cluster; assign levels of risk for suspicious and/or criminal activity to the addresses and the financial transactions; and responsive to comparisons of levels of risk with a threshold, report transactions for suspicious and/or criminal activity.

20 Claims, 4 Drawing Sheets

Related U.S. Application Data continuation of application No. 16/114,021, filed on Aug. 27, 2018, now Pat. No. 10,380,594.

(51) Int. Cl.
*G06F 16/951* (2019.01)
*H04L 9/06* (2006.01)

(56) References Cited

U.S. PATENT DOCUMENTS

| | | |
|---|---|---|
| 9,818,116 B2 | 11/2017 | Caldera |
| 9,870,562 B2 | 1/2018 | Davis |
| 10,275,772 B2 | 4/2019 | Ronca |
| 10,380,594 B1 | 8/2019 | Bayer |
| 10,902,431 B2 | 1/2021 | Bayer |
| 2015/0310424 A1 | 10/2015 | Myers |
| 2015/0365283 A1* | 12/2015 | Ronca ............... G06Q 20/3829 705/71 |
| 2016/0071108 A1* | 3/2016 | Caldera ............. G06Q 20/4016 705/75 |
| 2017/0091397 A1* | 3/2017 | Shah ..................... H04L 63/20 |
| 2018/0075453 A1 | 3/2018 | Durvasula |
| 2018/0082268 A1* | 3/2018 | Sheerin ............. G06Q 20/4014 |
| 2018/0240112 A1* | 8/2018 | Castinado ........... G06Q 20/065 |
| 2019/0019180 A1* | 1/2019 | Coburn ................ H04L 9/0637 |
| 2019/0188716 A1* | 6/2019 | Merz .................. G06Q 20/4093 |
| 2020/0065815 A1 | 2/2020 | Bayer |
| 2021/0192526 A1* | 6/2021 | Kuchar ............... G06Q 20/065 |

\* cited by examiner

SYSTEMS AND METHODS FOR MONITORING AND ANALYZING FINANCIAL TRANSACTIONS ON PUBLIC DISTRIBUTED LEDGERS FOR SUSPICIOUS AND/OR CRIMINAL ACTIVITY

FIELD OF THE DISCLOSURE

The present disclosure relates to systems and methods configured for monitoring and analyzing financial transactions on public distributed ledgers for suspicious and/or criminal activity.

BACKGROUND

Monitoring and analyzing financial transactions for suspicious and/or criminal activity is known, in particular for traditional electronic financial transactions between financial institutions. Conducting financial transactions on public distributed ledgers is known, in particular transactions including the exchange of amounts of cryptocurrency.

SUMMARY

One aspect of the present disclosure relates to a system configured for monitoring and analyzing financial transactions on public distributed ledgers for suspicious and/or criminal activity. The system may include one or more hardware processors configured by machine-readable instructions. The processor(s) may be configured to obtain information regarding a set of financial transactions that are recorded on a public distributed ledger. The set of financial transactions may include a first set of addresses. A first individual recorded transaction may include a first sender address and a first receiver address. A second individual recorded transaction may include a second sender address and a second receiver address. The processor(s) may be configured to access, through a network connection, public third-party information for a second set of addresses that includes one or both of the first sender address and/or the first receiver address. The public third-party information may originate from one or more public online sources that are external to the public distributed ledger. The processor(s) may be configured to correlate a first portion of the public third-party information that pertains to one or both of the first sender address and/or the first receiver address with one or both of the first sender address and/or the first receiver address. The first portion of the public third-party information may originate from a first public online source that is external to the public distributed ledger. The processor(s) may be configured to label one or more of the financial transactions and/or the addresses in the first set of addresses with labels representing characteristics of the one or more financial transactions and/or the addresses, such that individual ones of the addresses in the first set of addresses either have been labeled or are unlabeled. One or both of the first sender address and/or the first receiver address may be labeled with a first label. The first label may represent a first characteristic of the first individual recorded transaction. Labeling with the first label may be based on one or more of an entity, an activity, a platform, a correlation, and/or a product related to the first individual recorded transaction. One or both of the second sender address and/or the second receiver address may be unlabeled so far. The processor(s) may be configured to cluster one or more of the financial transactions and/or the addresses into a set of clusters that includes a first cluster. Clustering may be based on associations of different addresses. One or more addresses labeled with the first label may be clustered into the first cluster with one or both of the second sender address that is unlabeled, and/or the second receiver address that is unlabeled. Clustering into the first cluster may be based on an association between one or more addresses labeled with the first label and one or both of the second sender address and/or the second receiver address. The association may be based on one or more of a financial transaction from the set of financial transactions and/or based on the public third-party information. The processor(s) may be configured to assign levels of risk for suspicious and/or criminal activity to the first set of addresses that have been labeled with the first label, and to the second sender address and the second receiver address. The processor(s) may be configured to assign levels of risk for suspicious and/or criminal activity to the financial transactions from the set of financial transactions. A first level of risk may be assigned to the first individual recorded transaction and a second level of risk is assigned to the second individual recorded transaction. Assignment of the first level of risk may be based on at least the first label. Assignment of the second level of risk may be based on at least the assigned levels of risk of the second sender address and the second receiver address. The processor(s) may be configured to, responsive to comparisons of the first level of risk and the second level of risk with a risk threshold level, report one or both of the first and/or second individual recorded transactions for suspicious and/or criminal activity.

Another aspect of the present disclosure relates to a method configured for monitoring and analyzing financial transactions on public distributed ledgers for suspicious and/or criminal activity. The method may include obtaining information regarding a set of financial transactions that are recorded on a public distributed ledger. The set of financial transactions may include a first set of addresses. A first individual recorded transaction may include a first sender address and a first receiver address. A second individual recorded transaction may include a second sender address and a second receiver address. The method may include accessing, through a network connection, public third-party information for a second set of addresses that includes one or both of the first sender address and/or the first receiver address. The public third-party information may originate from one or more public online sources that are external to the public distributed ledger. The method may include correlating a first portion of the public third-party information that pertains to one or both of the first sender address and/or the first receiver address with one or both of the first sender address and/or the first receiver address. The first portion of the public third-party information may originate from a first public online source that is external to the public distributed ledger. The method may include labeling one or more of the financial transactions and/or the addresses in the first set of addresses with labels representing characteristics of the one or more financial transactions and/or the addresses, such that individual ones of the addresses in the first set of addresses either have been labeled or are unlabeled. One or both of the first sender address and/or the first receiver address may be labeled with a first label. The first label may represent a first characteristic of the first individual recorded transaction. Labeling with the first label may be based on one or more of an entity, an activity, a platform, a correlation, and/or a product related to the first individual recorded transaction. One or both of the second sender address and/or the second receiver address may be unlabeled so far. The method may include clustering one or more of the financial transactions and/or the addresses into a set of clusters that includes a first cluster. Clustering may be based on associations of different addresses. One or more addresses labeled with the first label may be clustered into the first cluster with one or both of the second sender address that is unlabeled, and/or the second receiver address that is unlabeled. Clustering into the first cluster may be based on an association between one or more addresses labeled with the first label and one or both of the second sender address and/or the second receiver address. The association may be based on one or more of a financial transaction from the set of financial transactions and/or based on the public third-party information. The method may include assigning levels of risk for suspicious and/or criminal activity to the first set of addresses that have been labeled with the first label, and to the second sender address and the second receiver address. The method may include assigning levels of risk for suspicious and/or criminal activity to the financial transactions from the set of financial transactions. A first level of risk may be assigned to the first individual recorded transaction and a second level of risk is assigned to the second individual recorded transaction. Assignment of the first level of risk may be based on at least the first label. Assignment of the second level of risk may be based on at least the assigned levels of risk of the second sender address and the second receiver address. The method may include, responsive to comparisons of the first level of risk and the second level of risk with a risk threshold level, reporting one or both of the first and/or second individual recorded transactions for suspicious and/or criminal activity.

As used herein, any association (or relation, or reflection, or indication, or correspondency, or correlation) involving transactions, addresses, labels, clusters, levels of risk, public online sources, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
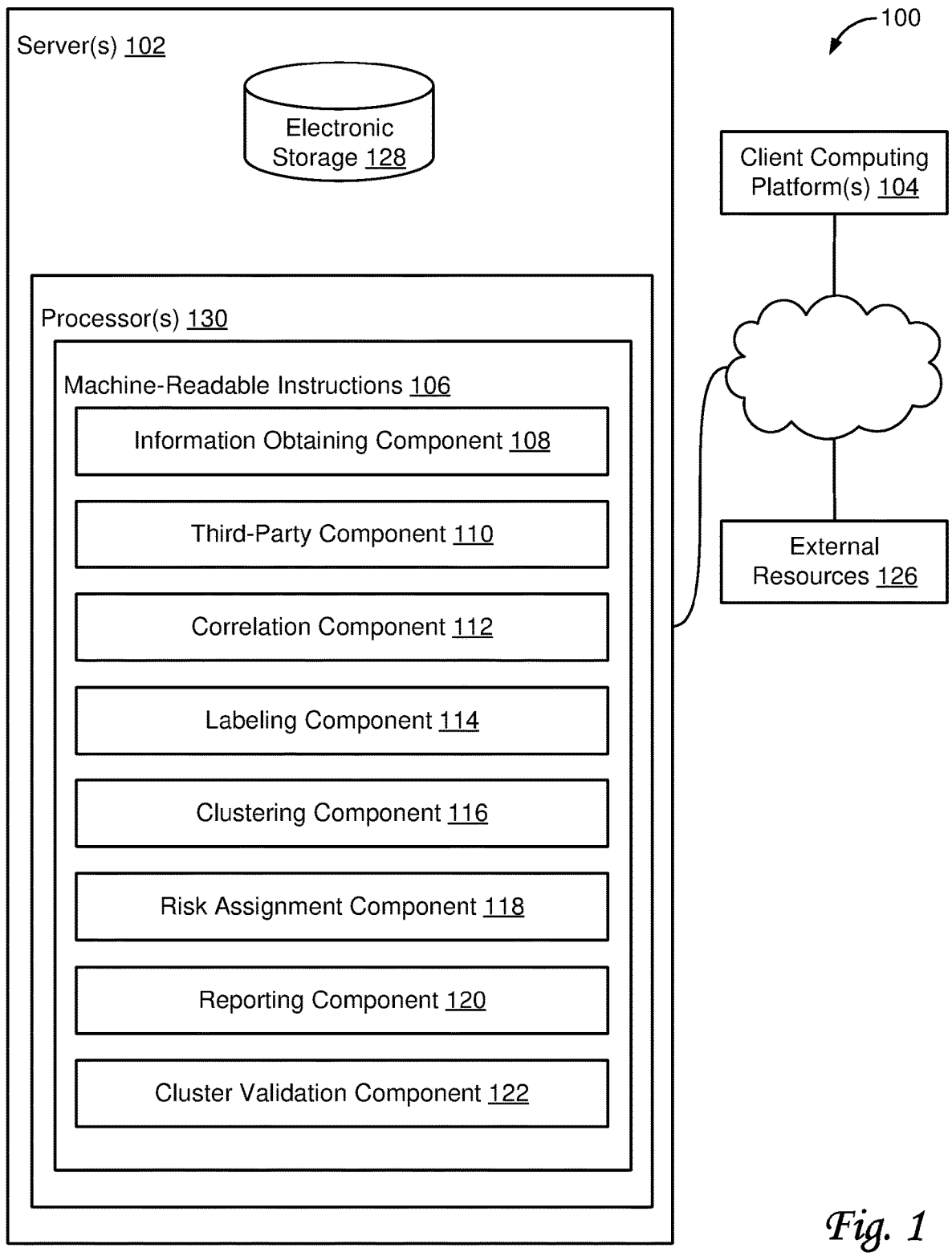
FIG. 1 shows a system configured for monitoring and analyzing financial transactions on public distributed ledgers for suspicious and/or criminal activity, in accordance with one or more implementations.

FIG. 1 illustrates a system 100 configured for monitoring and analyzing financial transactions on distributed ledgers for suspicious and/or criminal activity, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. By way of non-limiting example, suspicious and/or criminal activity may pertain to fraud, sale of illegal goods, funding of terrorism, money-laundering and/or other financial activities. In some implementations, the used definition of suspicious and/or criminal activity may be governed by acts and/or regulations of international governmental bodies, national governments, the federal government, and/or other legal entities.

Distributed ledgers or decentralized ledgers may be configured to produce a secure record or registry of ownership of assets, transactions, and other information. For example, a blockchain is a distributed ledger. Blockchain technology may be used for cryptocurrencies, smart contracts, and other applications for a decentralized database. In some implementations, a distributed ledger may be a public distributed ledger if at least some of its information is publicly available. In some implementations, applications may be stored and/or executed on the distributed ledger. For example, such an application may be referred to as a distributed application. In some implementations, a distributed ledger may form the basis for a payment platform, e.g., Bitcoin, and/or other payment platforms. In some implementations, the distributed ledger may form the basis for a distributed computing platform, e.g., Ethereum, and/or other distributed computing platforms.

A distributed ledger may act as a decentralized database that stores a registry of assets, transactions, and/or other information across one or more networks. A given asset may be owned by a particular user. The asset may include anything of material value or usefulness that is owned by a person or company, according to some implementations. In some implementations, the distributed ledger may record ownership of assets and/or transactions that modify ownership of assets. A smart contract is a type of asset. In some implementations, once a smart contract, transaction, and/or message has been added to the distributed ledger, it may be referred to as published and/or posted. Services may be offered through a distributed application (or decentralized application) that is implemented through a distributed computing platform and based on a distributed ledger. The distributed ledger may be publicly accessible and append-only. In some implementations, existing blocks of the distributed ledger can substantially not be altered or deleted, unless multiple copies of the distributed ledger are altered. This is unlikely to happen provided that multiple copies of the distributed ledger are stored on different computing platforms, e.g. in different geographical locations. The distributed ledger may be replicated on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of an information obtaining component 108, a third-party component 110, a correlation component 112, a labeling component 114, a clustering component 116, a risk assignment component 118, a reporting component 120, a cluster validation component 122, and/or other instruction components.

Information obtaining component 108 may be configured to obtain information regarding a set of financial transactions that are recorded on one or more distributed ledgers, e.g., one or more public distributed ledgers. The set of financial transactions may include a first individual recorded transaction, a second individual recorded transaction, a third individual recorded transaction, and so forth. The set of financial transactions may include a first set of addresses. Addresses in the first set of addresses may be associated with sending and/or receiving transactions. An individual recorded transaction may include one or more sender addresses and/or one or more receiver addresses. The one or more sender addresses may include a first sender address. The one or more receiver addresses may include a first receiver address. An individual recorded transaction may include an exchange of an amount of currency, including but not limited to a cryptocurrency. In some implementations, the amount of cryptocurrency may include one or both of Bitcoin and/or Ether. By way of non-limiting example, the second individual recorded transaction may include a second sender address and a second receiver address, the third individual recorded transaction may include a third sender address and a third receiver address, and so forth. In some implementations, information obtaining component 108 may be configured to monitor and/or track transactions published on different public distributed ledgers.

Figure 3A:
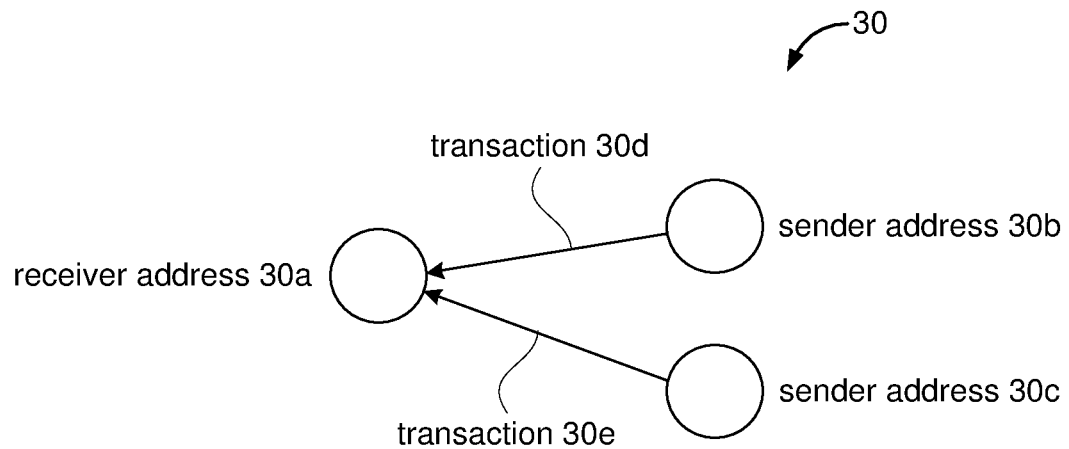
FIGS. 3A-3B illustrate exemplary transaction graphs as may be used by the disclosed systems and methods, in accordance with one or more implementations.
Figure 3B:
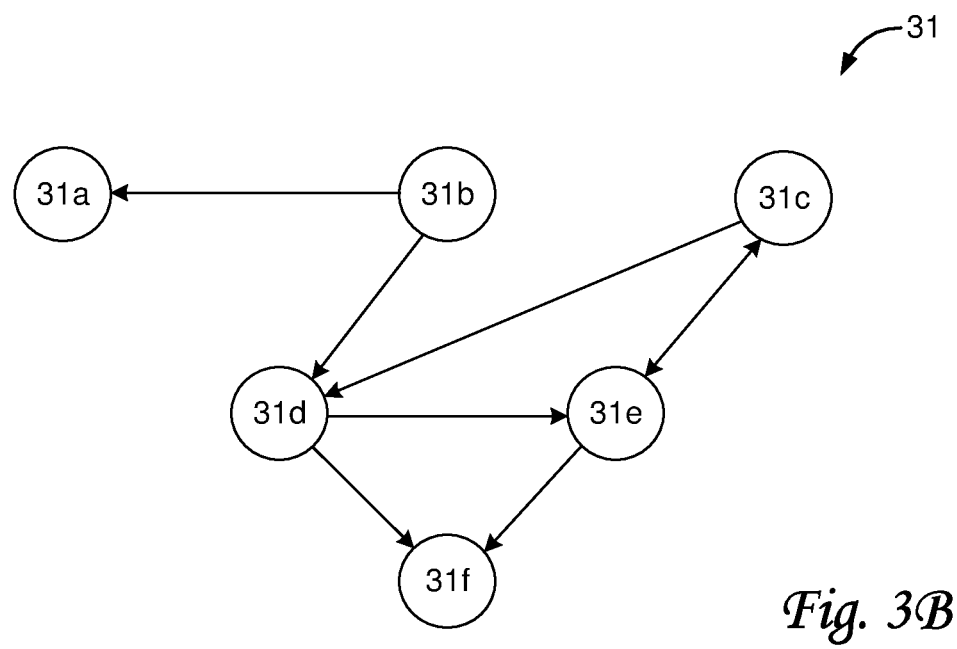

By way of non-limiting example, FIGS. 3A-3B illustrate exemplary transaction graphs as may be used by system 100. For example, FIG. 3A depicts a transaction graph 30 that may be derived from and/or based on information obtained regarding a set of financial transactions that are recorded on one or more distributed ledgers. As depicted in FIG. 3A, the set of transactions may include a first transaction 30d between a sender address 30b and a receiver address 30a, and a second transaction 30e between a sender address 30c and receiver address 30a. First transaction 30d involves a sender associated with sender address 30b paying a receiver associated with receiver address 30a some amount of currency, e.g., a first amount of cryptocurrency. Second transaction 30e involves a sender associated with sender address 30c paying the receiver associated with receiver address 30a some amount of currency, e.g., a second amount of cryptocurrency. As depicted, transaction graph 30 may include nodes for sender/receivers (or sending addresses and receiving addresses), and edges between nodes to represent individual transactions. In some implementations, connections in a transaction graph may be directional, for example to indicate the flow of payment. In some implementations, an individual connection in a transaction graph may represent multiple transactions between two entities. In some implementations, nodes may be associated with additional information, including but not limited to a balance for a particular currency, a cumulative amount of currency received and/or sent, and/or one or more parameters indicating the rate at which currency is received and/or sent. In some implementations, edges may be associated with additional information, including but not limited to the number of transactions between two entities and/or the amount exchanged between particular entities in a particular transaction.

FIG. 3B depicts a transaction graph 31 that may be derived from and/or based on information obtained regarding a set of financial transactions that are recorded on one or more distributed ledgers. As depicted in FIG. 3B, the set of transactions may include transactions between six addresses: address 31a, address 31b, address, 31c, address 31d, address 31e, address 31f, and/or other addresses. Some addresses only have incoming transactions associated, such as address 31a or address 31f. Some addresses only have outgoing transactions associated, such as address 31b. Some addresses have combinations of incoming and outgoing transactions, such as address 31d. In some implementations, multiple transactions in either direction may be depicted by a double-headed arrow, as shown between address 31c and address 31e. Analysis of a graph such as transaction graph 31 may reveal which addresses (and/or entities associated therewith) are more active than others (e.g., in cumulative amount of currency, in number of different transactions, in number of different direct connections, and/or in number of different connections within a predetermined number of transactions). For example, address 31d is connected directly to four other addresses, while address 31a is connected directly to only one other address. A direct connection may be referred to as a first-level connection. The next level of connection may be referred to as second-level connection. For example, address 31a has a first-level connection to address 31b, a second-level connection to address 31d, and a third-level connection to address 31f. In some implementations, connection types may be further distinguished based on one or more directions of the pertinent edges. For example, the connections from address 31b to address 31d, to address 31e, and to address 31f are all in the same direction.

Referring to FIG. 1, third-party component 110 may be configured to access, through a network connection, public third-party information for a second set of addresses. Addresses in the second set of addresses may be associated with sending and/or receiving transactions. The second set of addresses may include different addresses than the first set of addresses, and/or vice versa. The first set of addresses may have some addresses in common with the second set of addresses. By way of non-limiting example, the second set of addresses may include one or both of the first sender address and/or the first receiver address that are associated with the first individual recorded transaction. Accessing the public third-party information may include obtaining the public third-party information through a web crawler. The public third-party information may originate from one or more public online sources that are external to the public distributed ledger. Some public online sources may be deemed more reliable than others. For example, comments from FACEBOOK™ may be deemed more or less reliable than comments from an anonymous forum. Some public online sources may be deemed more nefarious than others.

For example, forums on darknet or the deep web may be deemed more nefarious than forums on the world wide web. In some implementations, portions of the public third-party information may include textual comments. Processing portions of the public third-party information may include natural language processing of the textual comments. In some implementations, comments may be alphanumerical. In some implementations, comments may include icons, emojis, and/or other visual depictions.

Correlation component 112 may be configured to correlate portions of the public third-party information with one or more addresses, e.g., a particular address in the first set of addresses, and/or a particular address in the second set of addresses. In some implementations, correlation component 112 may be configured to correlate a first portion of the third-party information that pertains to one or both of the first sender address and/or the first receiver address with one or both of the first sender address and/or the first receiver address. The first portion of the public third-party information may originate from a first public online source that is external to the public distributed ledger. In some implementations, correlation component 112 may be configured to correlate a second portion of the third-party information that pertains to one or both of the second sender address and/or the second receiver address with one or both of the second sender address and/or the second receiver address. The second portion of the public third-party information may originate from a second public online source that is external to the public distributed ledger. In some implementations, a particular portion of the third-party information may pertain to both the first sender address and the second sender address. In some implementations, a particular portion of the third-party information may pertain to both the first sender address and the second receiver address. In some implementations, a particular portion of the third-party information may pertain to both the first receiver address and the second sender address. In some implementations, a particular portion of the third-party information may pertain to both the first receiver address and the second receiver address.

In some implementations, correlations may be between multiple addresses. For example, a first portion of the public third-party information may refer to a first address, and a second portion of the public third-party information (that is somehow related to the first portion, e.g., by virtue of originating from the same online user) may refer to a second address. In such a case, the first address and the second address may be correlated. In some implementations, correlation may be depicted, stored, and/or otherwise processed in a manner similar to a transaction graph. For example, a connection or edge may connect the first address and the second address, even if no single transaction includes the first address and the second address as the sender address and the receiver address.

Labeling component 114 may be configured to label one or more of the financial transactions and/or the addresses in the first set of addresses with labels representing characteristics of the one or more financial transactions and/or the addresses, such that individual ones of the addresses in the first set of addresses either have been labeled or are unlabeled. One or both of the first sender address and/or the first receiver address may be labeled with a first label. Labeling with the first label may be further based on the correlated public third-party information pertaining to one or both of the first sender address and/or the first receiver address. The first portion of the public third-party information pertaining to one or both of the first sender address and/or the first receiver address may include textual comments. Labeling with the first label may include natural language processing of the textual comments.

The first label may represent a first characteristic of the first individual recorded transaction. By way of non-limiting example, labeling with the first label may be based on one or more of an entity, an activity, a platform, a correlation, and/or a product related to the first individual recorded transaction. One or both of the second sender address and/or the second receiver address may be unlabeled so far.

Figure 4A:
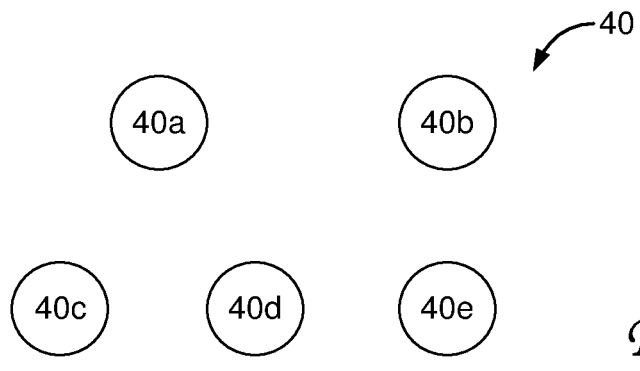
FIGS. 4A-4B-4C illustrate exemplary sets of addresses and/or transactions as may be used by the disclosed systems and methods, in accordance with one or more implementations.
Figure 4B:
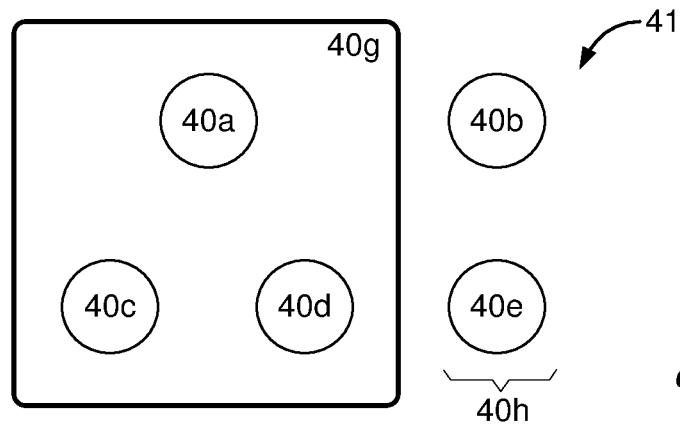
Figure 4C:
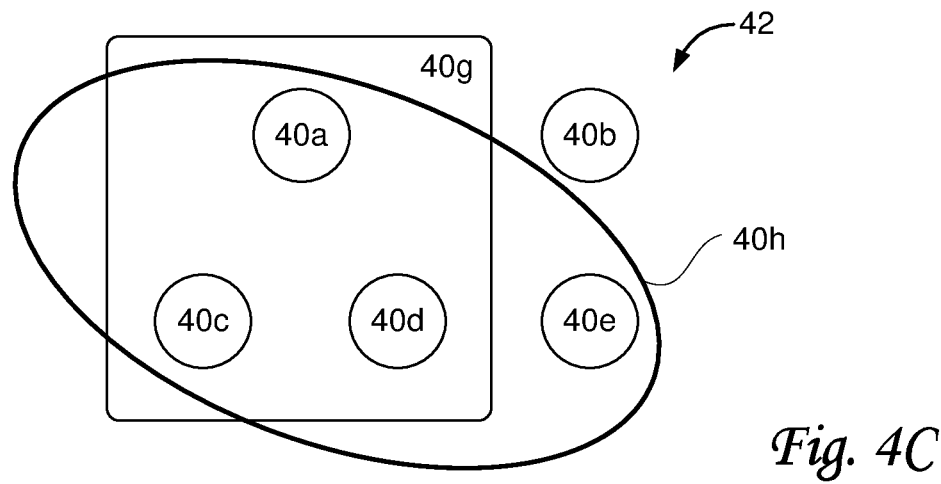

By way of non-limiting example, FIGS. 4A-4B-4C illustrate exemplary sets of addresses and/or transactions as may be used by system 100. For example, FIG. 4A depicts a set of addresses 40 that may be derived from and/or based on information obtained regarding a set of financial transactions that are recorded on one or more distributed ledgers. As depicted in FIG. 4A, the set of addresses 40 may include a first address 40a, a second address 40b, a third address 40c, a fourth address 40d, and a fifth address 40e. The set of addresses 40 may be entirely unlabeled as depicted in FIG. 4A. Transactions between addresses in set of addresses 40 are not shown.

For example, FIG. 4B depicts a set of addresses 41 that may be derived from and/or based on information obtained regarding a set of financial transactions that are recorded on one or more distributed ledgers, e.g., based on set of addresses 40 of FIG. 4A. In FIG. 4B, address 40a, address 40b, and address 40c may be labeled with a label 40g. In some implementations, label 40g may be based on information pertaining to the transactions of address 40a, address 40b, and address 40c. In some implementations, label 40g may be based on one or more of an entity, an activity, a platform, a correlation, and/or a product related to one or more transactions among address 40a, address 40b, and address 40c. By way of non-limiting example, labels may include one or more of "malware", "ransom", "phishing", "darknet", "Coinbase", "Walmart", "Satoshi Dice", "gambling", and/or other labels. In some implementations, label 40g may be based on correlations made by correlation component 112, in particular based on one or more portions of the public third-party information. In some implementations, combinations of information recorded on one or more distributed ledgers may be combined with one or more portions of the public third-party information, such that the combination forms the basis for labeling addresses and/or transactions with one or more labels. In some implementations, a single address may be labeled with multiple labels. In some implementations, a single transaction may be labeled with multiple labels. In FIG. 4B, address 40e and address 40b for a set 40h of unlabeled addresses.

Clustering component 116 may be configured to cluster one or more of the financial transactions and/or the addresses into a set of clusters that includes a first cluster. Clustering may be based on associations of different addresses. One or more addresses labeled with the first label may be clustered into the first cluster with one or both of the second sender address that is unlabeled, and/or the second receiver address that is unlabeled. Clustering into the first cluster may be based on an association between one or more addresses labeled with the first label and one or both of the second sender address and/or the second receiver address. The association may be based on one or more of a financial transaction from the set of financial transactions and/or based on the public third-party information.

In some implementations, a result of clustering a previously unlabeled address may be to label that address, e.g., with one or more of the same labels as other addresses within the same cluster.

By way of non-limiting example, FIG. 4C depicts a set of addresses 42 that may be derived from and/or based on information obtained regarding a set of financial transactions that are recorded on one or more distributed ledgers, e.g., based on set of addresses 41 of FIG. 4B. In FIG. 4C, address 40a, address 40b, and address 40c may be labeled with label 40g. The addresses associated with label 40g may be clustered with an unlabeled address such as address 40e, into a cluster 40h. In some implementations, the clustering of cluster 40h may be based on one or more associations between a labeled address and an unlabeled address. In some implementations, the clustering of cluster 40h may be based on information pertaining to the transactions of the associated addresses. In some implementations, the clustering of cluster 40h may be based on one or more of an entity, an activity, a platform, a correlation, and/or a product related to one or more transactions among the associated addresses. In some implementations, the clustering of cluster 40h may be based on correlations made by correlation component 112, in particular based on one or more portions of the public third-party information. In some implementations, combinations of information recorded on one or more distributed ledgers may be combined with one or more portions of the public third-party information, such that the combination forms the basis for clustering addresses in particular clusters. In some implementations, a single address may be labeled with multiple clusters. In some implementations, a single transaction may be labeled with multiple clusters.

Risk assignment component 118 may be configured to assign levels of risk for suspicious and/or criminal activity to addresses, including but not limited to a set of addresses. In some implementations, risk assignment component 118 may be configured to assign levels of risk to a one or more addresses that have been labeled with a particular label, and/or clustered within a particular cluster. For example, in some implementations, a particular level of risk may be assigned based on the particular label or labels associated with an address. For example, in some implementations, a particular level of risk may be assign based on a particular cluster associated with an address. In some implementations, a particular level of risk may be assigned based of a graph analysis of a transaction graph for a set of addresses and/or transactions. For example, referring to FIG. 3B, assuming that address 31d has been labeled with a particular label representing highly suspicious and/or criminal activity (e.g., "ransomware"), then addresses directly connected to address 31d, such as address 31f, may be assigned with a higher level of risk by virtue of the connectivity of the transactions within a set of transactions. In some implementations, levels of risk may be represented numerically, e.g., with a risk score ranging from 1 to 100. Different labels may be associated with different risk scores. For example, "darknet" may be assigned a risk score of 50, whereas "ransomware" may be assigned a risk score of 95. Through graph analysis, a risk level or score may be determined and/or assigned to a specific address that has, e.g., a first-level connection to an address labeled "darknet" and a second-level connection to an address labeled "ransomware," having a value between 50 and 95. Depending on the implementation, the specific address may be assigned a risk score of 78 (or, in other words, closer to 95 than to 50).

In some implementations, risk assignment component 118 may be configured to assign levels of risk to the one or more public online sources such that a risk level is assigned to an individual public online source.

In some implementations, risk assignment component 118 may be configured to assign levels of risk for suspicious and/or criminal activity to the financial transactions from the set of financial transactions. A first level of risk may be assigned to a first individual recorded transaction (having a first sender address and a first receiver address) and a second level of risk may be assigned to a second individual recorded transaction (having a second sender address and a second receiver address). Assignment of the first level of risk may be based on at least a first label (of the first sender address and/or the first receiver address). Assignment of the second level of risk may be based on at least the assigned levels of risk of the second sender address and the second receiver address (e.g., after clustering of the second sender address and the second receiver address). One or both of the assignment of the first level of risk and/or the assignment of the second level of risk may be further based on the risk level of the first public online source from which information originated that was used to determine pertinent labels and/or clusters. In some implementations, a transaction associated with multiple levels of risk (e.g., due to the particular public online source, the assigned label, the assigned cluster, etc.) may be assigned a single level of risk (e.g., a risk score) by apply weights to the individual associated levels of risk.

Reporting component 120 may be configured to report recorded transactions for suspicious and/or criminal activity. In some implementations, reporting component 120 may be configured to, responsive to comparisons of one or more levels of risk with one or more risk threshold levels, report recorded transactions for suspicious and/or criminal activity. In some implementations, reporting component 120 may be configured to, responsive to comparisons of the first level of risk and the second level of risk with a risk threshold level, report one or both of the first and/or second individual recorded transactions for suspicious and/or criminal activity.

Cluster validation component 122 may be configured to validate labels and/or clusters. For example, cluster validation component 122 may be configured to validate a particular cluster, e.g., the first cluster. In some implementations, validation may include transferring a particular amount of cryptocurrency to one or more addresses labeled with a particular label and/or clustered within a particular cluster. Subsequently, validation may include monitoring one or more balances associated with the particular label or the particular cluster, to determine whether the particular amount of cryptocurrency was added to a pertinent address and/or balance.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, and/or 122, and/or other components. Processor(s) 130 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 130 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 130 may be configured to execute one or more additional components that may perform some or all of the functionality attributed below to one of components 108, 110, 112, 114, 116, 118, 120, and/or 122.

Figure 2:
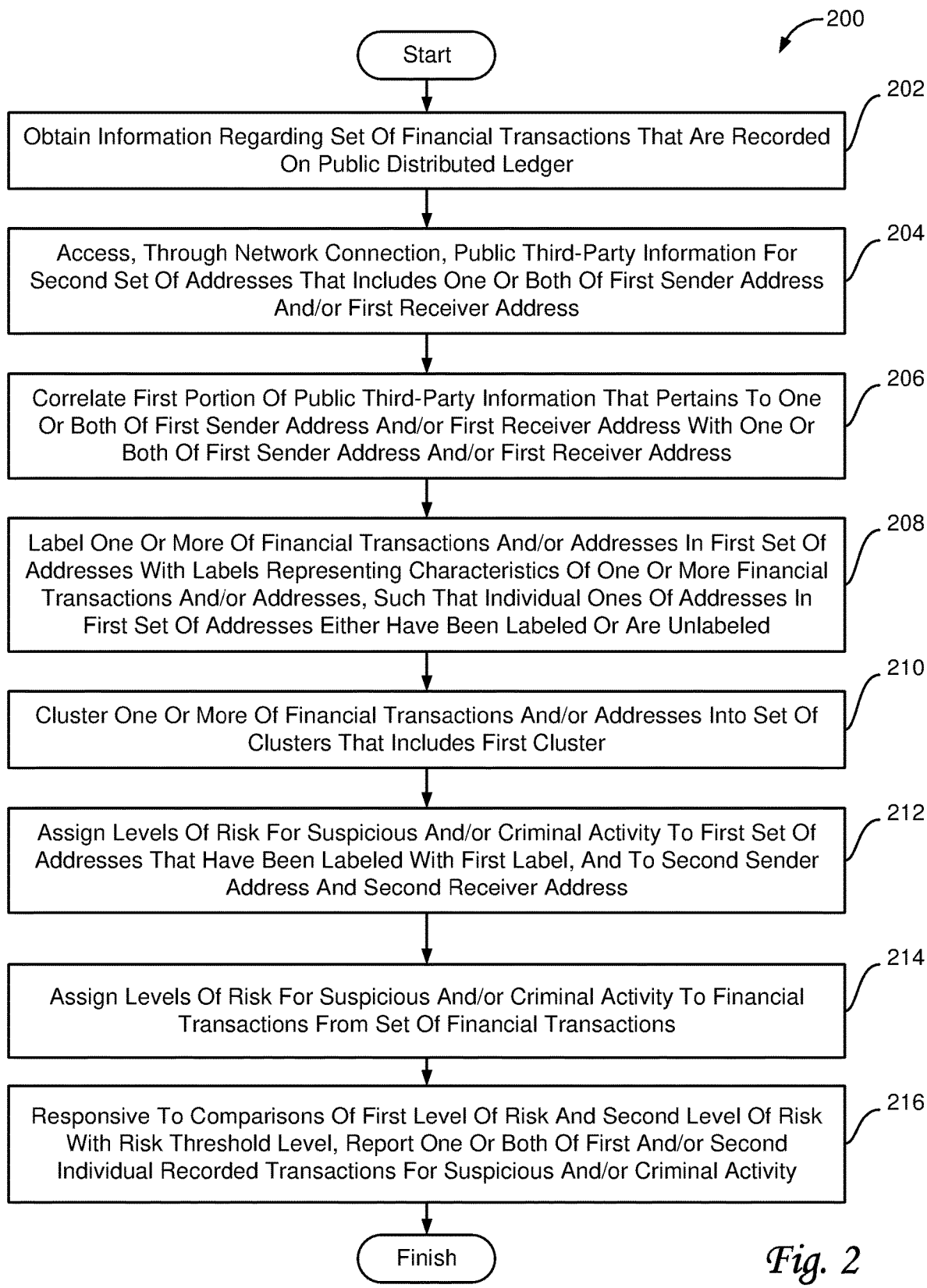
FIG. 2 includes a flow chart of a method configured for monitoring and analyzing financial transactions on public distributed ledgers for suspicious and/or criminal activity, in accordance with one or more implementations.

FIG. 2 illustrates a method 200 configured for monitoring and analyzing financial transactions on public distributed ledgers for suspicious and/or criminal activity, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining information regarding a set of financial transactions that are recorded on a public distributed ledger. The set of financial transactions may include a first set of addresses. A first individual recorded transaction may include a first sender address and a first receiver address. A second individual recorded transaction may include a second sender address and a second receiver address. Operation 202 may be performed by one or more hardware processors configured by machine-readable instructions including a component that is the same as or similar to information obtaining component 108, in accordance with one or more implementations.

An operation 204 may include accessing, through a network connection, public third-party information for a second set of addresses that includes one or both of the first sender address and/or the first receiver address. The public third-party information may originate from one or more public online sources that are external to the public distributed ledger. Operation 204 may be performed by one or more hardware processors configured by machine-readable instructions including a component that is the same as or similar to third-party component 110, in accordance with one or more implementations.

An operation 206 may include correlating a first portion of the public third-party information that pertains to one or both of the first sender address and/or the first receiver address with one or both of the first sender address and/or the first receiver address. The first portion of the public third-party information may originate from a first public online source that is external to the public distributed ledger. Operation 206 may be performed by one or more hardware processors configured by machine-readable instructions including a component that is the same as or similar to correlation component 112, in accordance with one or more implementations.

An operation 208 may include labeling one or more of the financial transactions and/or the addresses in the first set of addresses with labels representing characteristics of the one or more financial transactions and/or the addresses, such that individual ones of the addresses in the first set of addresses either have been labeled or are unlabeled. One or both of the first sender address and/or the first receiver address may be labeled with a first label. The first label may represent a first characteristic of the first individual recorded transaction. Labeling with the first label may be based on one or more of an entity, an activity, a platform, a correlation, and/or a product related to the first individual recorded transaction. One or both of the second sender address and/or the second receiver address may be unlabeled so far. Operation 208 may be performed by one or more hardware processors configured by machine-readable instructions including a component that is the same as or similar to labeling component 114, in accordance with one or more implementations.

An operation 210 may include clustering one or more of the financial transactions and/or the addresses into a set of clusters that includes a first cluster. Clustering may be based on associations of different addresses. One or more addresses labeled with the first label may be clustered into the first cluster with one or both of the second sender address that is unlabeled, and/or the second receiver address that is unlabeled. Clustering into the first cluster may be based on an association between one or more addresses labeled with the first label and one or both of the second sender address and/or the second receiver address. The association may be based on one or more of a financial transaction from the set of financial transactions and/or based on the public third-party information. Operation 210 may be performed by one or more hardware processors configured by machine-readable instructions including a component that is the same as or similar to clustering component 116, in accordance with one or more implementations.

An operation 212 may include assigning levels of risk for suspicious and/or criminal activity to the first set of addresses that have been labeled with the first label, and to the second sender address and the second receiver address. Operation 212 may be performed by one or more hardware processors configured by machine-readable instructions including a component that is the same as or similar to risk assignment component 118, in accordance with one or more implementations.

An operation 214 may include assigning levels of risk for suspicious and/or criminal activity to the financial transactions from the set of financial transactions. A first level of risk may be assigned to the first individual recorded transaction and a second level of risk is assigned to the second individual recorded transaction. Assignment of the first level of risk may be based on at least the first label. Assignment of the second level of risk may be based on at least the assigned levels of risk of the second sender address and the second receiver address. Operation 214 may be performed by one or more hardware processors configured by machine-readable instructions including a component that is the same as or similar to risk assignment component 118, in accordance with one or more implementations.

An operation 216 may include responsive to comparisons of the first level of risk and the second level of risk with a risk threshold level, reporting one or both of the first and/or second individual recorded transactions for suspicious and/or criminal activity. Operation 216 may be performed by one or more hardware processors configured by machine-readable instructions including a component that is the same as or similar to reporting component 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for monitoring and analyzing transactions on one or more public distributed ledgers for suspicious or criminal activity, wherein the transactions include individual transactions in a set of transactions, the system comprising:

one or more hardware processors configured by machine-readable instructions to:

obtain information regarding the set of transactions recorded on a public distributed ledger, the public distributed ledger including a blockchain and an identification of individual user accounts, wherein the set of transactions includes a first individual recorded transaction and a second individual recorded transaction, wherein the first individual recorded transaction includes a first transfer from a first sender account to a first receiver account, wherein the second individual recorded transaction includes a second transfer from a second sender account to a second receiver account;

access, through a network connection, public third-party information for a second set of user accounts that includes at least one of the first sender account and the first receiver account, wherein the public third-party information originates from one or more public online sources that are external to the public distributed ledger;

determine a correlation between (a) a first portion of the public third-party information that pertains to the first sender account and (b) the first sender account, wherein the first portion of the public third-party information includes textual comments, and wherein labeling with a first label includes processing of the textual comments;

label one or more of the individual user accounts with labels representing characteristics of at least one of the one or more transactions and the user accounts, such that individual ones of the individual user accounts either have been labeled or are unlabeled, and further such that the first sender account is labeled with the first label, wherein the first label represents a first characteristic of the first individual recorded transaction, and wherein at least one of the second sender account and the second receiver account are unlabeled so far;

cluster one or more of the transactions into a set of clusters that includes a first cluster, wherein clustering is based on associations of different user accounts, wherein the individual user accounts labeled with the first label are clustered into the first cluster with at least one of:
(i) the second sender account that is unlabeled, and
(ii) the second receiver account that is unlabeled, wherein clustering into the first cluster is based on an association between (a) one or more individual user accounts labeled with the first label and (b) at least one of the second sender account and the second receiver account, wherein the association is based on the public third-party information;

assign levels of risk for suspicious or criminal activity to the individual user accounts that have been labeled with the first label, and to one or both of the second sender account and the second receiver account;

assign levels of risk for suspicious or criminal activity to the transactions from the set of transactions, wherein a first level of risk is assigned to the first individual recorded transaction and a second level of risk is assigned to the second individual recorded transaction, wherein assignment of the first level of risk is based on at least the first label, wherein assignment of the second level of risk is based on at least the assigned levels of risk of at least one of the second sender account and the second receiver account; and responsive to comparisons of the first level of risk and the second level of risk with a risk threshold level, record at least one of the first and second individual recorded transactions for suspicious or criminal activity.

2. The system of claim 1, wherein the one or more hardware processors are further configured to:
obtain information regarding the set of transactions.

3. The system of claim 1, wherein the one or more hardware processors are further configured to:
obtain a transaction graph that represents the individual transactions, wherein nodes represent the individual user accounts, wherein edges between nodes represent the individual transactions, and wherein assignment of the levels of risk for suspicious or criminal activity is based at least in part on a graph analysis of the transaction graph.

4. The system of claim 1, wherein the first transfer is a transfer of an amount of cryptocurrency.

5. The system of claim 1, wherein accessing the public third-party information includes obtaining the public third-party information through a web crawler.

6. The system of claim 1, wherein labeling with the first label is further based on the correlated public third-party information pertaining to at least one of the first sender account and the first receiver account.

7. The system of claim 1, wherein the set of transactions includes financial transactions, wherein the first individual recorded transaction includes a first sender address on the blockchain, and wherein the first sender address identifies the first sender account.

8. The system of claim 1, wherein the one or more hardware processors are further configured by machine-readable instructions to:
assign levels of risk to the one or more public online sources such that a particular risk level is assigned to a first public online source;
wherein one or both of the assignment of the first level of risk and/or the assignment of the second level of risk is further based on the particular risk level of the first public online source.

9. The system of claim 1, wherein the one or more hardware processors are further configured by machine-readable instructions to:
validate the first cluster by transferring a particular amount of cryptocurrency to one or more user accounts labeled with the first label and monitoring one or more balances associated with the first cluster.

10. A method configured for monitoring and analyzing transactions on one or more public distributed ledgers for suspicious or criminal activity, wherein the transactions include individual transactions in a set of transactions, the method comprising:
obtaining, through a network connection, information regarding the set of transactions recorded on a public distributed ledger, the public distributed ledger including a blockchain and an identification of individual user accounts, wherein the set of transactions includes a first individual recorded transaction and a second individual recorded transaction, wherein the first individual recorded transaction includes a first transfer from a first sender account to a first receiver account, wherein the second individual recorded transaction includes a second transfer from a second sender account to a second receiver account;

accessing, through the network connection, public third-party information for a second set of user accounts that includes at least one of the first sender account and the first receiver account, wherein the public third-party information originates from one or more public online sources that are external to the public distributed ledger;

determining a correlation between (a) a first portion of the public third-party information that pertains to the first sender account and (b) the first sender account, wherein the first portion of the public third-party information includes textual comments, and wherein labeling with a first label includes processing of the textual comments;

labeling one or more of the individual user accounts with labels representing characteristics of at least one of the one or more transactions and the user accounts, such that individual ones of the individual user accounts either have been labeled or are unlabeled, wherein the first sender account is labeled with the first label, wherein the first label represents a first characteristic of the first individual recorded transaction, and wherein at least one of the second sender account and the second receiver account are unlabeled so far;

clustering one or more of the transactions into a set of clusters that includes a first cluster, wherein clustering is based on associations of different user accounts, wherein the individual user accounts labeled with the first label are clustered into the first cluster with at least one of:

(i) the second sender account that is unlabeled, and
(ii) the second receiver account that is unlabeled,
  wherein clustering into the first cluster is based on an association between (a) one or more individual user accounts labeled with the first label and (b) at least one of the second sender account and the second receiver account, wherein the association is based on the public third-party information;
assigning levels of risk for suspicious or criminal activity to the individual user accounts that have been labeled with the first label, and to at least one of the second sender account and the second receiver account;
assigning levels of risk for suspicious or criminal activity to the transactions from the set of transactions, wherein a first level of risk is assigned to the first individual recorded transaction and a second level of risk is assigned to the second individual recorded transaction, wherein assignment of the first level of risk is based on at least the first label, wherein assignment of the second level of risk is based on at least the assigned levels of risk of at least one of the second sender account and the second receiver account; and
responsive to comparisons of the first level of risk and the second level of risk with a risk threshold level, recording at least one of the first and second individual recorded transactions for suspicious or criminal activity.

11. The method of claim 10, further comprising:
obtaining information regarding the set of transactions.

12. The method of claim 10, further comprising:
obtaining a transaction graph that represents the individual transactions, wherein nodes represent the individual user accounts, wherein edges between nodes represent the individual transactions, and wherein assigning the levels of risk for suspicious or criminal activity is based at least in part on a graph analysis of the transaction graph.

13. The method of claim 10, wherein the first transfer includes a transfer of an amount of cryptocurrency.

14. The method of claim 13, wherein the amount of cryptocurrency includes at least one of Bitcoin and Ether.

15. The method of claim 10, wherein accessing the public third-party information includes obtaining the public third-party information through a web crawler.

16. The method of claim 10, wherein labeling with the first label is further based on the correlated public third-party information pertaining to at least one of the first sender account and the first receiver account.

17. The method of claim 10, wherein the set of transactions includes financial transactions, wherein the first individual recorded transaction includes a first sender address on the blockchain, and wherein the first sender address identifies the first sender account.

18. The method of claim 10, further comprising:
assigning levels of risk to the one or more public online sources such that a particular risk level is assigned to a first public online source;
wherein one or both of the assignment of the first level of risk and/or the assignment of the second level of risk is further based on the particular risk level of the first public online source.

19. The method of claim 10, further comprising:
validating the first cluster by transferring a particular amount of cryptocurrency to one or more user accounts labeled with the first label and monitoring one or more balances associated with the first cluster.

20. The method of claim 10, wherein the processing of the textual comments includes natural language processing.

* * * * *